April 9, 1935.   R. J. SCHMERBER   1,997,234
METHOD OF SUPPLYING CURRENT AND APPARATUS FOR ARC WELDING
Filed June 26, 1933

Inventor:
Raoul Jean Schmerber
By
Attorney.

Patented Apr. 9, 1935

1,997,234

UNITED STATES PATENT OFFICE 1,997,234

METHOD OF SUPPLYING CURRENT AND APPARATUS FOR ARC WELDING

Raoul Jean Schmerber, Brussels, Belgium, assignor to La Soudure Electrique Autogene Societe Anonyme, Brussels, Belgium Application June 26, 1933, Serial No. 677,721
In France May 24, 1933

13 Claims. (Cl. 219—8)

Up to the present time transformers having special characteristics and the secondary of which supplied a sinusoidal electromotive force have been employed for supplying alternating current to arc welding circuits.

In general, these transformers have a very high dispersion so as to have a holding on characteristic on a falling load, which condition is necessary to ensure good stability of the arc.

The open circuit difference of potential was always rather high and of the order of 75–100 volts, while the difference of potential on load fell automatically to 25–30 volts on account of the special characteristics of these transformers.

Welding transformers of this type also had a power factor of 0.2–0.3 because of the self-induction effect producing the drop in voltage on load. The ratio between the differences of potential on open and closed circuit being high (from 3–4), and the apparent power of the transformer being also high, the efficiency of the installation was quite poor.

The object of the invention is to overcome these disadvantages to a large extent. For this purpose, in accordance with the invention, at the beginning of each alternation and during a small fraction of the total period of this alternation, a difference of potential necessary and sufficient for producing the ionization of the arcing space and consequently for striking the arc, is applied across the electrode and the object to be welded, and then, during practically the remainder of the period of the alternation, a difference of potential merely equal to or slightly greater than that necessary and sufficient to maintain the arc is applied. The curve representing the differences of potential applied across the electrode and the object to be welded during an alternation has therefore, for a very short time, a pronounced peak at the beginning of the alternation, then a substantially horizontal stretch during practically the remainder of the period of the alternation and finally falls fairly steeply to zero.

To carry out this process easily with a sinusoidal source of alternating current, a device comprising a group of two transformers connected in parallel may advantageously be used, one of which transformers called the "principal transformer" being an ordinary welding transformer capable of developing in its secondary a sinusoidal difference of potential merely sufficient to maintain the arc, and the other transformer, called the "auxiliary transformer", giving rise in its secondary to a difference of potential represented by a pointed curve, the apex of the point corresponding to a difference of potential sufficient to strike the arc.

When the current is supplied from a three-phase source, the auxiliary transformer is supplied from the phase which is 120 electrical degrees in advance relatively to the phase which supplies the principal transformer (which is assumed to be single phase). Experience has shown that under the most favourable practical conditions, in order that the curve which represents the differences of potential applied across the electrode and the object to be welded during one alternation may have the above mentioned substantially horizontal stretch immediately following the said peak, the auxiliary transformer is preferably constructed so that its effective electromotive force is greater, for example, 18–20% greater, than the effective electromotive force of the principal transformer. This can be explained by noting that the two transformers to be connected in parallel produce waves the shape factors of which are very different.

The above mentioned voltage peak is advantageously produced in the auxiliary transformer by a magnetic saturation effect of the secondary core. For this purpose, this core is made so as to be quickly saturated.

Other features and details of the invention will appear in the course of the description of the drawing attached to the present specification and which represents diagrammatically several forms of embodiment of the invention.

Figure 1 is a diagrammatic representation of a device suitable for carrying the method in accordance with the invention into effect, Figure 2 is a curve representing the differences of potential existing across the terminals of the secondary of the principal transformer during one alternation of the source of current.

Figure 3 represents diagrammatically an embodiment of an auxiliary transformer in accordance with the invention, Figure 4 is a curve representing diagrammatically the differences of potential existing across the terminals of the secondary of the auxiliary transformer, Figure 5 represents diagrammatically a variant of an auxiliary transformer in accordance with the invention, Figure 6 is a curve representing diagrammatically the differences of potential produced on open circuit across the electrode and the object to be welded in the case in which the effective electromotive forces produced in the secondaries of the principal and auxiliary transformers are equal, and in which the transformers are supplied with voltages 120° out of phase.

In the various figures the same references indicate identical parts.

Figure 1:
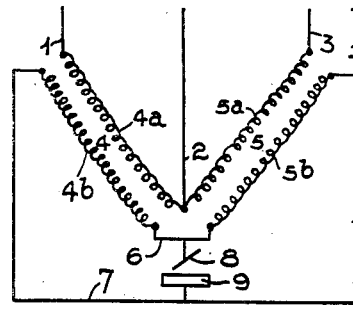

1, 2, 3 (Figure 1) are the three distributing lines of a three-phase source of current. The primary 4a of a transformer 4 hereinafter called the "auxiliary transformer" is branched on the phase 1, 2. The power of this auxiliary transformer is low and is, for example, from 500–1000 volt-amperes.

The primary 5a of a transformer 5, hereinafter called the "principal transformer", is branched on the phase 2, 3. The secondary 4b of the auxiliary transformer 4 is connected by conductors 6 and 7 in parallel with the secondary 5b of the principal transformer 5. The electrode 8 and the object 9 to be welded are thus supplied in parallel by the two transformers 4 and 5.

The principal transformer 5 is an ordinary arc welding transformer but it is constructed so that on open circuit it only develops the voltage sufficient to maintain the arc. This voltage is, for example, from 45–55 volts.

Figure 2:
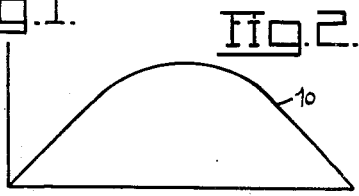

The curve representing the differences of potential produced on open circuit in the secondary is, for example of the order of that shown at 10 in Figure 2.

Figure 3:
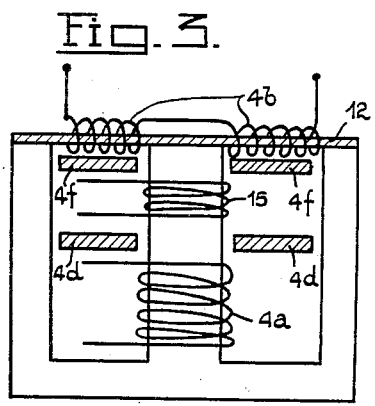

The auxiliary transformer 4 is a transformer having the core of its secondary constructed so as to be rapidly saturated by the magnetic flux produced by the current flowing in the primary coil. This core comprises for example, as represented in Figure 3, a part such as 12 made of permalloy or any other magnetic alloy having approximately the same permeability. The auxiliary transformer 4 also has magnetic shunts 4d the position of which can be adjusted so as to cause the leakage flux through them to vary.

Figure 4:
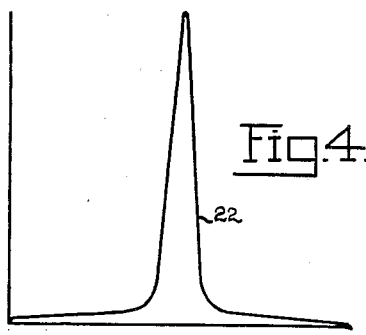

A transformer of this type has, owing to the saturation effect of the secondary core, the characteristic that it gives rise to a voltage curve 22 (Figure 4) having a pronounced peak, and the width of which at about half amplitude is equivalent to 10–15 electrical degrees according to the value allotted for the saturation induction.

The maximum electromotive force developed in the auxiliary secondary is, for example, two to three times the electromotive force read on the voltmeter, that is to say in the case indicated above, from two to three times 45 volts.

Figure 5:
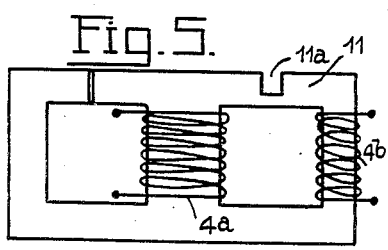

The auxiliary transformer 4 could also be constructed in a different manner from that represented in Figure 3. Its core could for example, as shown in Figure 5, have a part of reduced cross section relatively to the remainder of the core. This reduced section is obtained by providing a notch 11a in the core 11 of the secondary. In the other branch of the magnetic circuit a variable air gap is provided which serves as a magnetic shunt to enable the secondary current to be varied.

The transformers 4 and 5 are connected to a three phase source of current so that the auxiliary transformer 4 is supplied with a voltage 120 electrical degrees in advance of the voltage supplied to the principal transformer 5.

Figure 6:
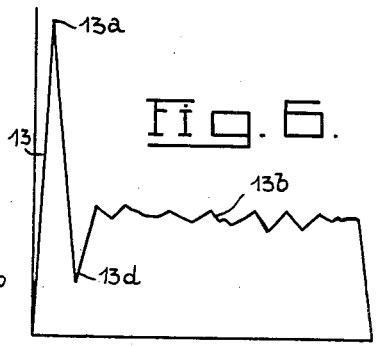

The open circuit voltage curve resulting from the parallel connection of the transformers 4 and 5 supplied in this way, can be registered by an oscillograph. It is a curve of the type of the curve 13 shown in Figure 6. It will be noted that this curve has a voltage peak 13a separated from a substantially horizontal stretch 13b by a depression 13d, and that this horizontal stretch extends practically to the end of the alternation. The electromotive force in a very short period (about 1/800th of a second) reaches at the beginning of the alternation a relatively high value (about 100 volts, for example); this electromotive force falls to about 45 volts immediately after, then keeps this value during the remainder of the alternation and at the end of the latter rapidly falls to zero.

In order to avoid the formation of the hollow 13d it is only necesary to construct the auxiliary transformer 4 so that the effective electromotive force of its secondary is slightly greater than that of the secondary of the principal transformer 5. For example, a suitable result has been obtained with an effective electromotive force in the secondary of the auxiliary transformer 18–20% greater than that in the secondary of the principal transformer.

Figure 7:
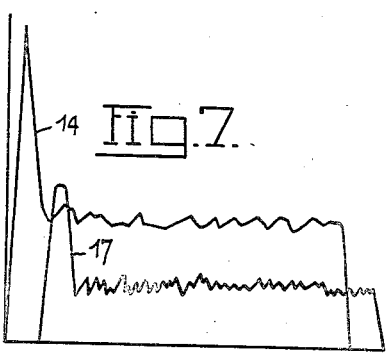
Figure 7 is a curve of the type of that shown in Figure 6 in the case where the auxiliary transformer develops in its secondary an electromotive force greater than that developed by the principal transformer.

In these circumstances, the curve registered by an oscillograph is of the type of the curve 14 shown in Figure 7. On load that is to say during welding, the mean voltage falls automatically from 45 volts to 25 volts.

The shape of the curve showing the voltage, across the terminals of the arc under permanent conditions, is of the same type as the curve 14 in Figure 7 and is shown as 17. As usual, this curve is out of phase relatively to the off-load curve. If, for one reason or another the arc were to be extinguished, the pronounced voltage peak produced by the auxiliary transformer would immediately restrike it. Thus, excellent stability is obtained.

A phase displacement winding on the same core as the primary of the auxiliary transformer may also be employed to produce a suitable phase displacement angle of the electromotive force in the secondary of the auxiliary transformer in accordance with the invention, in the case where the supply is obtained from a single phase source of current or a two-phase source of current.

Figure 8:
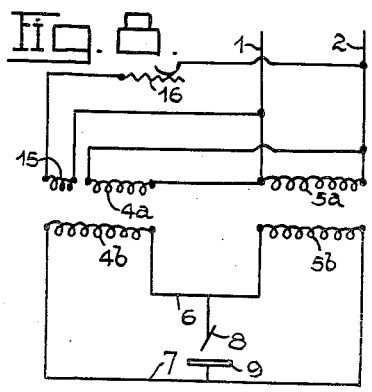
Figure 8 is a circuit diagram for the supply of current to a transformer in accordance with the invention from a single phase network.

The supply diagram of an auxiliary transformer in accordance with the invention from a single phase network is represented by way of example in Figure 8. The phase displacement winding is shown at 15.

The amount of the phase displacement may be adjusted so that the voltage peak due to the auxiliary transformer occurs at the beginning of the resulting electromotive force curve, by causing the intensity of the current passing through the phase displacement winding 15 to be varied, preferably by means of a rheostat 16.

A phase displacement winding 15 has also been shown in Figure 3 on the same core as the primary 4a. Suplementary magnetic shunts 4f similar to the magnetic shunts 4d are also provided in this case.

For supplying an auxiliary transformer from a two phase network, a phase displacement winding similar to the winding 15 would be used, but acting so as to produce a different phase displacement appropriate to this case.

With the object of reducing the circulating currents in the two transformers connected in parallel, precautions are taken that the short-circuiting voltage, the reactance voltage and the resistance losses of one of these transformers is equal or substantially equal to the corresponding factors of the other transformer. The two triangles formed by the graphical testing method for transformers due to Kapp and known as Kapp's triangles must be equal.

The auxiliary transformer which forms part of the invention may obviously be connected to a welding transformer of any type provided the conditions which have just been set forth as to identity of the two Kapp's triangles are satisfied. The principal transformer may, for example, also be of the single-phase type.

The device in accordance with the invention has the advantage of providing for an easy striking of the arc while only necessitating a low open circuit voltage. It produces a better efficiency of the installation. Indeed, the relation between the open circuit and the on-load voltage is 45 to 25 instead of the usual 80 to 25. Lastly, it improves the power factor of the installation.

What I claim is:

1. Method of feeding an arc welding circuit with alternating current consisting in applying on open circuit across the electrode and the object to be welded at the beginning of each alternation and during a small fraction of the total time of the latter, a difference of potential sufficient for striking the arc and in then applying, during substantially the rest of the alternation, a difference of potential equal to or slightly greater than that necessary for maintaining the arc.

2. Apparatus for feeding an arc welding circuit from a sinusoidal source of alternating current, comprising a principal transformer analogous to an ordinary welding transformer and capable of developing in its secondary, for each alternation of the source of current, a difference of potential sufficient for maintaining an arc after having been struck, an auxiliary transformer capable of developing on open circuit in its secondary, for each alternation of the source of current, a difference of potential represented by a curve with one sharp peak whose apex corresponds to a difference of potential necessary and sufficient to strike the arc, means for displacing the phase relations of the feeding currents of the primaries of the two transformers such that the said sharp peak of tension occurs at the beginning of the alternation in the secondary of the principal transformer, and connections for applying the tension generated in the secondaries of the two transformers across the electrode and the object to be welded.

3. Apparatus for feeding an arc welding circuit from a three-phase source of alternating current, comprising a principal transformer analogous to an ordinary welding transformer and capable of developing in its secondary, for each alternation of the source of current, a difference of potential necessary and sufficient for maintaining an arc after having been struck, an auxiliary transformer capable of developing on open circuit in its secondary, for each alternation of the source of current, a difference of potential represented by a curve with one sharp peak whose apex corresponds to a difference of potential necessary and sufficient to strike the arc, connections for branching the primary of the principal transformer on one phase of the source of current, connections for branching the primary of the auxiliary transformer on the phase at 120 electrical degrees in advance of the phase on which the primary of the principal transformer is branched, and connections for applying the tensions generated in the secondaries of the two transformers across the electrode and the object to be welded.

4. Apparatus for feeding an arc welding circuit from a sinusoidal source of alternating current, comprising a principal transformer analogous to an ordinary welding transformer and capable of developing in its secondary, for each alternation of the source of current, a difference of potential necessary and sufficient for maintaining an arc after having been struck, an auxiliary transformer capable of developing on open circuit in its secondary, for each alternation of the source of current, a difference of potential represented by a curve with one sharp peak whose apex corresponds to a difference of potential necessary and sufficient to strike the arc, the auxiliary transformer being constructed so that its effective electromotive force is greater than the effective electromotive force of the principal transformer, means for displacing the phase relations of the feeding currents of the primaries of the two transformers such that the said sharp peak of tension occurs at the beginning of the alternation in the secondary of the principal transformer, and connections for applying the tensions generated in the secondaries of the two transformers across the electrode and the object to be welded.

5. Apparatus for feeding an arc welding circuit from a three-phase source of alternating current, comprising a principal transformer analogous to an ordinary welding transformer and capable of developing in its secondary, for each alternation of the source of current, a difference of potential necessary and sufficient for maintaining an arc after having been struck, an auxiliary transformer capable of developing on open circuit in its secondary, for each alternation of the source of current, a difference of potential represented by a curve with one sharp peak whose apex corresponds to a difference of potential necessary and sufficient to strike the arc, the auxiliary transformer being constructed so that its effective electromotive force is greater than the effective electromotive force of the principal transformer, connections for branching the primary of the principal transformer on one phase of the source of current, connections for branching the primary of the auxiliary transformer on the phase at 120 electrical degrees in advance of the phase on which the primary of the principal transformer is branched, and connections for applying the tensions generated in the secondaries of the two transformers across the electrode and the object to be welded.

6. Apparatus for feeding an arc welding circuit from a three-phase source of alternating current, comprising a principal transformer analogous to an ordinary welding transformer and capable of developing in its secondary, for each alternation of the source of current, a difference of potential necessary and sufficient for maintaining an arc after having been struck, an auxiliary transformer capable of developing on open circuit in its secondary, for each alternation of the source of current, a difference of potential represented by a curve with one sharp peak whose apex corresponds to a difference of potential necessary and sufficient to strike the arc, the auxiliary transformer being constructed so that its effective electromotive force is 18–20% greater than the effective electromotive force of the principal transformer, connections for branching the primary of the principal transformer on one phase of the source of current, connections for branching the primary of the auxiliary transformer on the phase at 120 electrical degrees in advance of the phase on which the primary of the principal transformer is branched, and connections for applying the tensions generated in the secondaries of the two transformers across the electrode and the object to be welded.

7. Apparatus for feeding an arc welding circuit from a sinusoidal source of alternating current, comprising a principal transformer analogous to an ordinary welding transformer and capable of developing in its secondary, for each alternation of the source of current, a difference of potential necessary and sufficient for maintaining an arc after having been struck, an auxiliary transformer, the secondary of which is constructed so as to be rapidly saturated by the magnetic flux produced by the current flowing in the primary coil and to develop on open circuit for each alteration of the source of current, a difference of potential represented by a curve with a sharp peak whose apex corresponds to a difference of potential necessary and sufficient to strike the arc, means for displacing the phase relations of the feeding currents of the primaries of the two transformers such that the said point of tension occurs at the beginning of the alternation in the secondary of the principal transformer, and connections for applying the tensions generated in the secondaries of the two transformers across the electrode and the object to be welded.

8. Apparatus for electric arc welding comprising a main transformer capable of developing from a sinusoidal voltage a secondary voltage sufficient to maintain the welding arc when once it is struck, an auxiliary transformer capable of developing a secondary voltage on open circuit of sharp peak wave form corresponding to arc striking voltage, means for controlling the phase relationship of the primary currents of the two transformers, and connections for applying the two secondary voltages in parallel to the welding place.

9. Apparatus for electric arc welding operative on a three-phase supply source, comprising a main transformer capable of developing from a sinusoidal voltage a secondary voltage sufficient to maintain the welding arc when once it is struck, an auxiliary transformer capable of developing a secondary voltage on open circuit of sharp peak wave form corresponding to arc striking voltage, means connecting the primary of the main transformer to one phase of the source, means connecting the primary of the auxiliary transformer to another phase of the source 120 electrical degrees in advance of the phase feeding the primary of the main transformer, and means for applying the two secondary voltages in parallel to the welding place.

10. Apparatus for electric arc welding comprising a main transformer capable of developing from a sinusoidal voltage a secondary voltage sufficient to maintain the welding arc when once it is struck, an auxiliary transformer capable of developing a secondary voltage on open circuit of sharp peak wave form corresponding to arc striking voltage, means for controlling the phase relationship of the primary currents of the two transformers, and connections for applying the two secondary voltages in parallel to the welding place, said phase relationship control means being capable of bringing the peak of the secondary voltage wave of the auxiliary transformer coincident with the beginning of the secondary voltage wave of the main transformer, and said auxiliary transformer having a higher effective E. M. F. than the main transformer.

11. Apparatus for electric arc welding operative on a three-phase supply source, comprising a main transformer capable of developing from a sinusoidal voltage a secondary voltage sufficient to maintain the welding arc when once it is struck, an auxiliary transformer capable of developing a secondary voltage on open circuit of sharp peak wave form corresponding to arc striking voltage, means connecting the primary of the main transformer to one phase of the source, means connecting the primary of the auxiliary transformer to another phase of the source 120 electrical degrees in advance of the phase feeding the primary of the main transformer, and means for applying the two secondary voltages in parallel to the welding place, said auxiliary transformer having a higher effective E. M. F. than the primary transformer.

12. Apparatus for electric arc welding comprising a main transformer capable of developing from a sinusoidal voltage a secondary voltage sufficient to maintain the welding arc when once it is struck, an auxiliary transformer capable of developing a secondary voltage on open circuit of sharp peak wave form corresponding to arc striking voltage, means for controlling the phase relationship of the primary currents of the two transformers, and connections for applying the two secondary voltages in parallel to the welding place, said phase relationship control means being capable of bringing the peak of the secondary voltage wave of the auxiliary transformer coincident with the beginning of the secondary voltage wave of the main transformer, and said auxiliary transformer having an effective E. M. F. 18–20% greater than that of the main transformer.

13. Apparatus for electric arc welding comprising a main transformer capable of developing from a sinusoidal voltage a secondary voltage sufficient to maintain the welding arc when once it is struck, an auxiliary transformer capable of developing a secondary voltage on open circuit of sharp peak wave form corresponding to arc striking voltage, means for controlling the phase relationship of the primary currents of the two transformers, and connections for applying the two secondary voltages in parallel to the welding place, said auxiliary transformer having its magnetic field rapidly saturable by the primary current flux.

RAOUL JEAN SCHMERBER.